United States Patent
Kidron (10) Patent No.: US 7,934,103 B2
(45) Date of Patent: Apr. 26, 2011

(54) DETECTING AND COUNTERING MALICIOUS CODE IN ENTERPRISE NETWORKS

(75) Inventor: Yaron Kidron, Mountain View, CA (US)

(73) Assignee: Computer Associates Think, Inc., Islandia, NY (US)

( * ) Notice: Subject to any disclaimer, the term of this patent is extended or adjusted under 35 U.S.C. 154(b) by 1454 days.

(21) Appl. No.: 10/414,117

(22) Filed: Apr. 15, 2003

(65) Prior Publication Data

US 2003/0200464 A1  Oct. 23, 2003

Related U.S. Application Data

(60) Provisional application No. 60/373,135, filed on Apr. 17, 2002.

(51) Int. Cl.
*G06F 11/30* (2006.01)
*G08B 9/00* (2006.01)

(52) U.S. Cl. .......... 713/188; 726/2; 726/3; 726/14; 726/22; 726/23; 726/24; 726/25; 713/164

(58) Field of Classification Search .......... 726/2, 22–25; 713/188
See application file for complete search history.

(56) References Cited

U.S. PATENT DOCUMENTS

| | | | |
|---|---|---|---|
| 5,414,833 A * | 5/1995 | Hershey et al. | 726/22 |
| 6,088,804 A | 7/2000 | Hill et al. | 713/201 |
| 6,279,113 B1 * | 8/2001 | Vaidya | 726/23 |
| 6,711,615 B2 * | 3/2004 | Porras et al. | 709/224 |
| 6,714,513 B1 * | 3/2004 | Joiner et al. | 370/224 |
| 6,789,202 B1 * | 9/2004 | Ko et al. | 726/23 |
| 6,792,546 B1 * | 9/2004 | Shanklin et al. | 726/23 |
| 6,892,227 B1 * | 5/2005 | Elwell et al. | 709/218 |
| 6,910,134 B1 * | 6/2005 | Maher et al. | 726/24 |
| 7,269,851 B2 * | 9/2007 | Ackroyd | 726/24 |
| 7,389,539 B1 * | 6/2008 | Kouznetsov | 726/22 |
| 2003/0140253 A1 * | 7/2003 | Crosbie et al. | 713/201 |
| 2003/0163729 A1 * | 8/2003 | Buchegger | 713/201 |
| 2003/0188189 A1 * | 10/2003 | Desai et al. | 713/201 |
| 2007/0234426 A1 * | 10/2007 | Khanolkar et al. | 726/23 |
| 2010/0122317 A1 * | 5/2010 | Yadav | 726/1 |

FOREIGN PATENT DOCUMENTS

| WO | WO 02/06928 | 1/2002 |
|---|---|---|
| WO | WO0206928 | 1/2002 |

OTHER PUBLICATIONS

Savage, Locking The Doors—Denial of Service Attacks and Viruses, CRN 2000, n 913, p. 72.*

(Continued)

*Primary Examiner* — Edan Orgad
*Assistant Examiner* — Jenise E Jackson
(74) *Attorney, Agent, or Firm* — Baker Botts L.L.P.

(57) ABSTRACT

A system and method for detecting and countering malicious code in an enterprise network are provided. A pattern recognition processor monitors local operations on a plurality of local machines connected through an enterprise network, to detect irregular local behavior patterns. An alert may be generated after an irregularity in behavior pattern on a local machine is detected. Irregular behavior alerts from a plurality of local machines are analyzed. If similar alerts are received from at least a threshold number of local machines over a corresponding period of time, one or more countermeasure operations are selected based on the analysis of the irregular behavior alerts. The selected countermeasure operations are communicated to the local machines and performed by the local machines.

24 Claims, 5 Drawing Sheets

OTHER PUBLICATIONS

Bassham Lawrence E. et al., Threat Assessment of Malicious Code and Human Computer Threats, (Japanese Polymer Science and (Japanese Polymer Science and Technology), Society of Polymer Science, No. 4939, Oct. 1992, pp. 1-2.

EPO Communication pursuant to Article 94(3) EPC; Ref. HCD/ J00046984EP; Application No. 03 719 797.7-2413, Nov. 10, 2008.

Bassham L E et al: "Threat Assessment of Malicious Code and Human Computer Threats" Kobunshi Ronbunshu (Japanese Polymer Science and Technology), Society of Polymer Science. Tokyo, JP No. 4939, Oct. 1992, pp. 1-12, XP002952539 ISSN: 0386-2186.

Communication pursuant to Article 96(2) EPC, Application No. 03 719 797.7-2413, 4 pages, Feb. 6, 2007.

\* cited by examiner

DETECTING AND COUNTERING MALICIOUS CODE IN ENTERPRISE NETWORKS

CROSS-REFERENCE TO RELATED APPLICATION

This application claims the benefit of commonly assigned U.S. Provisional Application No. 60/373,135, filed Apr. 17, 2002 and entitled "DETECTING AND COUNTERING MALICIOUS CODE IN ENTERPRISE NETWORKS".

TECHNICAL FIELD

This application relates to computer viruses and other malicious computer code. In particular, the application relates to detecting and countering viruses and other malicious code in an enterprise computing environment.

DESCRIPTION OF RELATED ART

In the current age of information, computers and other information technology (IT) play a substantial role in the operations of virtually all enterprises (for example, corporate entities, businesses, firms, establishments, a public and government bodies, departments, agencies, charities, other organizations, etc.). In many instances, enterprises open (at least a part of) their computer network and information systems to access by suppliers, partners, members, customers and other organizations, in order to facilitate exchange of data and information. An enterprise network may be configured as one or a combination of, for example, the following: a local area network (LAN), a wide area network (WAN), an intranet, a virtual private network (VPN) via remote access, an internet or the Internet, etc. In addition, enterprise users often are provided with modem or broadband access to an external network (and perhaps via their enterprise network) to obtain data/information from others.

Since an enterprise network often may provide an open environment, attack by malicious software, such as viruses, Trojans, worms and other malicious computer codes, is a continuous and increasing threat to computers and other components of the enterprise information system. Users in an enterprise computing environment typically are not aware that their computer is infected by malicious code, unless they are alerted, by the system, to the infection. Therefore, when a computer in the enterprise environment is hit by malicious code, the infection often quickly spreads across the enterprise network to other computers and enterprise resources. In most instances, the longer that a malicious code infects a network environment, the more difficult it is to eradicate the infection from the environment.

Many types of computer viruses are known to exist. Memory resident viruses typically attach themselves to executable files, and become loaded into a computer's memory when the executable file is run. Once in memory, the virus can take over the computer's operating system, and thereby gain access to restricted resources (such as security measures).

Boot sector viruses overwrite a boot sector of a computer's hard disk, which contains code that is executed when the system is booted, with viral code so that the virus is always loaded into the computer's memory when the computer is booted (for example, when the computer is started/restarted). Once in the computer's memory, the virus can quickly spread through the computer.

Some viruses hide and replicate themselves in a computer's file system, such as by infecting other programs/files when an infected program is run. Some file viruses may copy themselves into essential system files, thereby obtaining access to protected resources and rendering themselves more difficult to remove.

Viruses of another type are written in the macro language of specific computer programs (for example, word processing programs, spreadsheet programs, etc.), and are triggered when, for example, the program is run, a document is accessed through the program, or a user performs a predetermined action, such as a particular keystroke or menu choice, within the program.

Some viruses are polymorphic (for example, change their signatures periodically), so that they can evade signature scanning detection methods that scan for virus signatures. Hybrid or multipartite viruses have characteristics of more than one type of malicious code.

Some malicious codes have Trojan-like characteristics. Trojans operate, similar to the wooden horse of legend, by pretending to be something they are not. Typically, Trojans masquerade as useful or amusing software, while carrying viral or malicious code that executes on the target computer under the privileges afforded to the user running the program. Trojans often do not strike the hosting machine directly, but provide a backdoor for subsequent, more serious attacks.

A worm is a piece of software that propagates itself across computer networks, often without any human intervention (such as opening a file, running a program, etc.). Typically, it infects a network by exploiting bugs or overlooked features in commonly used network software running on the target computer.

Conventional security tools typically target known malicious codes, but are handicapped, however, against the ever-increasing stream of new viruses and other malicious codes. Such security tools often are playing catch-up to the proliferation of new malicious codes. Most conventional security tools need realignment or reconfiguration, such as through binary patches and/or algorithmic optimizations, to improve the tools' capabilities to detect and treat new security threats. Up until the tool is upgraded against a new threat, the tool is left inept, exposing the enterprise network to chaos caused by the threat.

In view of the abundance, and ever-changing character, of new security threats, proactive security tools, which are in operation even before a security breach has occurred, are needed.

Proactive security includes recognizing a potential threat. Most conventional security mechanisms rely on detecting fixed, known viral signatures or frequently-used techniques for attacking security deficiencies. Such detection mechanisms use virus signature files and/or fixed security policy rules. However, the signature files and/or policy rules must appropriately be updated before new malicious codes can be detected.

Conventional security measures typically treat malicious code as an atomic execution module designed to target a specific machine. However, as suggested above, most malicious codes are designed to propagate from one target machine to the next, and many malicious codes are self-propagating. Since malicious code typically is not an atomic unit, if a software virus has infiltrated into the enterprise environment, it should act similarly across several machines. Therefore, localizing the detection mechanism to a single machine is insufficient. In addition, most conventional security tools have a processing latency, which allows detection of and intervention against a malicious attack only after the attack has propagated substantially through the enterprise environment.

While some enterprise security tools may synchronize security policies across the enterprise network and/or collect client feedback, they do not synchronize the data received from the client machines to monitor large-scale client behavior, which can be a useful source of security information for diagnosing large-scale suspect behavior across the network environment.

Preventing, blocking and isolating malicious attacks are also part of a proactive security regimen. Conventional blocking procedures typically rely on fixed methodologies that provide limited immediate solutions for a crisis situation. In addition, such measures, in a network environment, usually rely on a fixed remote-management protocol, which severely limits functionality if an unanticipated attack requires action which the protocol is incapable of performing.

Therefore, new, more flexible methodologies for identifying and countering new computer viruses and malicious code are needed.

SUMMARY

The present disclosure provides a system for detecting and countering known and unknown malicious code in an enterprise network. In one embodiment, the system includes a server and a plurality of local machines connected to the server through the enterprise network. Each local machine includes a pattern recognition processor which monitors local operations to detect irregular local behavior patterns and generates an alert after an irregularity in local behavior pattern is detected. The server monitors for and analyzes irregular behavior alerts from the plurality of local machines. If similar alerts are received from at least a threshold number of local machines over a corresponding period of time, the server selects one or more countermeasure operations based on the analysis of the irregular behavior alerts and communicates to the local machines the selected countermeasure operations to be performed by the local machines.

The disclosure also provides a method of detecting and countering malicious code in an enterprise network system having a server and a plurality of local machines. In one embodiment, the method includes (a) monitoring local operations at each local machine to detect irregular local behavior patterns, and, if an irregularity in the local behavior pattern is detected at the local machine, generating an irregular behavior alert from the local machine to the server, and (b) analyzing at the server irregular behavior alerts from the local machines, and, if similar alerts are received from at least a threshold number of local machines over a corresponding period of time, selecting one or more countermeasure operations based on the analysis of the irregular behavior alerts and communicating the selected countermeasure operations to the local machines.

BRIEF DESCRIPTION OF THE DRAWINGS

The features of the present application can be more readily understood from the following detailed description with reference to the accompanying drawings wherein.

DETAILED DESCRIPTION

This application provides tools, in the form of systems and methods, for detecting and countering known and unknown malicious code in an enterprise network. Detection of malicious code may be accomplished through monitoring for irregular operations enterprise-wide, which in some instances may be attributed to new, unrecognized code being run. The tools may be embodied in one or more computer programs stored on a computer readable medium and/or transmitted via a computer network or other transmission medium.

The tools may be integrated, for example, with enterprise management software to more effectively detect compromises to enterprise-wide security. Enterprise workstations/computers (also referred herein as "local machines") typically are similarly configured (such as may be specified by enterprise policy). Most enterprise users use a similar collection of tools and have similar software usage habits. Enterprise users are typically grouped into logical collections, such as serving the same functionality (for example, Administration, Marketing, Support, etc.). The logical grouping renders them even more distinctly different from each other. Being different, each group can be self-tailored with a different profile, to be trained with a pattern recognition processor, as discussed below. When several workstations digress from their normal path of execution, it may be inferred that something irregular is occurring across the enterprise environment.

Figure 1A:
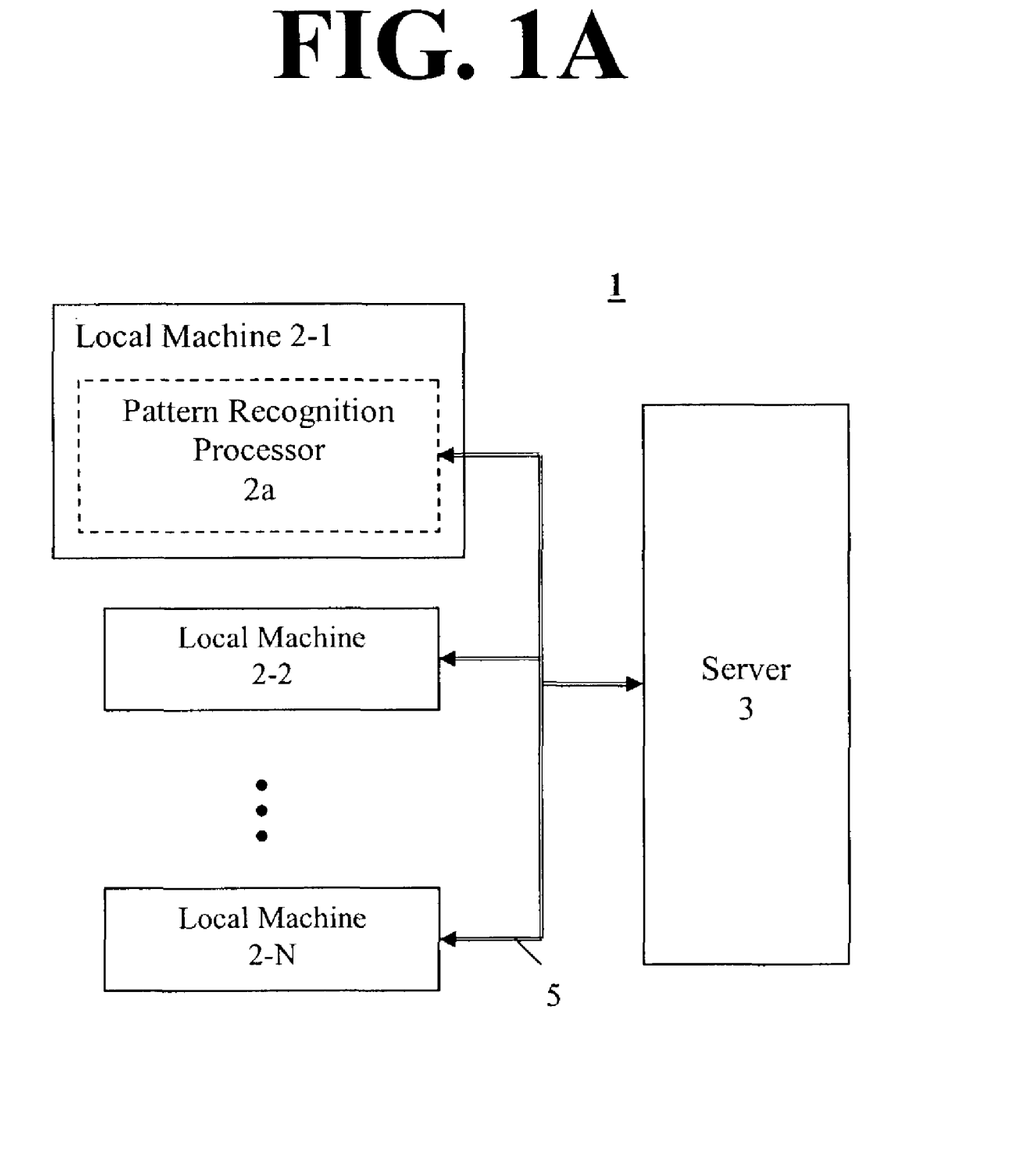
FIG. 1A shows a block diagram of a system for detecting and countering malicious code in an enterprise network, according to one embodiment of the present application.

A system for detecting and countering malicious code in an enterprise network, according to one embodiment, is shown in FIG. 1A. System 1 comprises a server 3 and local machines 2-1 through 2-N which are connected to the server through network 5. Each local machine (2-1 through 2-N) includes a pattern recognition processor 2a. The pattern recognition processor monitors local operations to detect irregular local behavior patterns, and generates an alert after an irregularity in local behavior pattern is detected. The server 3 monitors for and analyzes irregular behavior alerts from the local machines (2-1 through 2-N). If similar alerts are received from at least a threshold number of the local machines over a corresponding period of time, the server selects one or more countermeasure operations based on the analysis of the irregular behavior alerts and communicates to the local machines the selected countermeasure operations to be performed by the local machines.

Malicious code deployment of unknown nature (that is, of which there is no known signature or behavior pattern) in an enterprise environment may be detected through pattern recognition technology (such as neural nets, clustering techniques, decision tree techniques, etc.). For example, local out-of-pattern behavior at the local machines are monitored, continuously or periodically at short intervals, the results from a plurality of local machines connected through the enterprise network are synchronized, in order to recognize large scale irregular behavior patterns.

For example, the pattern recognition processor may monitor calls to the local operating system. A signal monitor may be provided for maintaining a log of the local operating system calls.

Each local machine further may include a remote control core including a network relay for communication with the server. The irregular behavior alert is communicated from the local machine through the network relay to the server. While detection of irregular behavior at a local machine may trigger issuance of an alert to the network, additional confirmation of irregular behavior may trigger interventional measures across the enterprise network. After detection of malicious code is confirmed, an abstract, the remote control core may be employed to promptly deploy changes, patches, or any possible action needed to handle the threat at the local machines. Remote control instructions can be received by the local machine through the network relay.

The system may further include a cluster manager. The irregular behavior alerts are communicated from the plurality of local machines through the cluster manager to the server.

The server may be a dedicated system for monitoring suspicious activity in the enterprise network. The countermeasure operations may include a notification to enterprise-wide administration utilities, an instruction to the local machines to shutdown one or more local functionalities associated with the irregular behavior alerts, and/or a warning by e-mail to users. A countermeasure operation communicated by the server to the local machines may be identified by library name and function call, or by utility name.

Figure 1B:
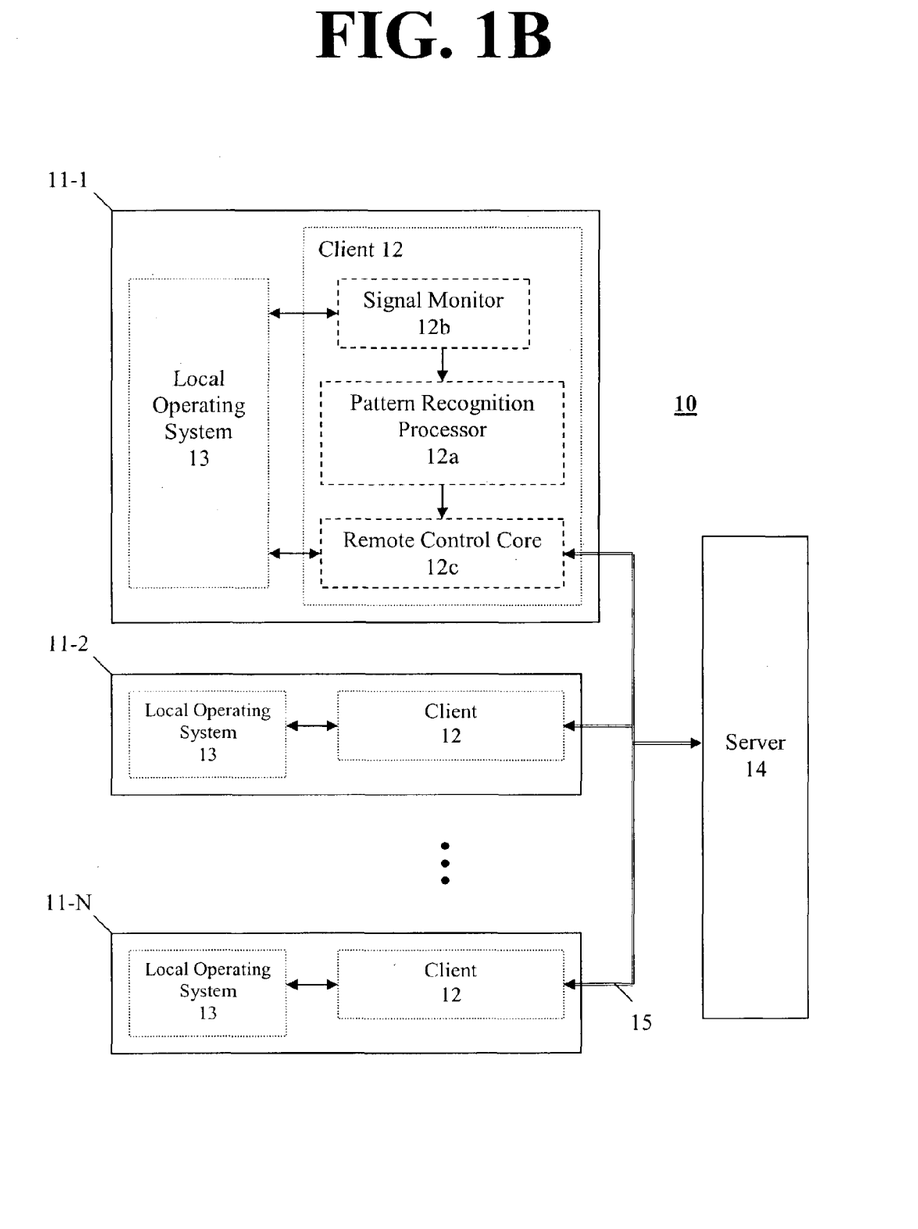
FIG. 1B shows a block diagram of a system, according to another embodiment of the present application, for detecting and countering malicious code in an enterprise network.

A system for detecting and countering malicious code in an enterprise network, according to a client-server paradigm, is shown in FIG. 1B. It should be understood, however, that the tools of the present application are not limited to a client-server programming model, and may be adapted for use in peer-to-peer systems, message passing systems, as well as other programming models.

System 10 comprises a server 14 and clients 12 on a plurality of local machines 11-1 through 11-N which are connected to the server through network 15. Each client 12 may include a pattern recognition processor 12a, and optionally an operating system signal monitor 12b and a remote control core 12c. The client 12, including pattern recognition processor, signal monitor and remote control core, may be a computer program stored on a computer readable medium on the corresponding local machine (11-1 . . . 11-N) and/or transmitted via a computer network or other transmission medium to the local machine. For example, the client may be a compact extension to an operating system kernel.

The pattern recognition processor 2a or 12a monitors operations on the corresponding local machine, such as calls to local operating system 13. The pattern recognition processor may employ neural net and other artificial intelligence technologies to detect irregular behavior patterns within the local machine. For example, the methodologies may include a combination of neural net, rule-based and state analysis techniques, such as described in commonly-owned U.S. Pat. Nos. 5,796,942, 5,734,796, 6,134,537, 6,212,509 and 6,327,550, and commonly-owned pending U.S. application Ser. Nos. 60/374,064 entitled "PROCESSING MIXED NUMERIC AND/OR NON-NUMERIC DATA", 60/374,020 entitled "AUTOMATIC NEURAL-NET MODEL GENERATION AND MAINTENANCE", 60/374,024 entitled "VIEWING MULTI-DIMENSIONAL DATA THROUGH HIERARCHICAL VISUALIZATION", 60/374,041 entitled "METHOD AND APPARATUS FOR DISCOVERING EVOLUTIONARY CHANGES WITHIN A SYSTEM" 60/373,977 entitled "AUTOMATIC MODEL MAINTENANCE THROUGH LOCAL NETS", and 60/373,780 entitled "USING NEURAL NETWORKS FOR DATA MINING", which are incorporated herein by reference in their entireties.

The pattern recognition processor may monitor local behavior pattern continuously or operate in time cycles, with preferably no more than a few minutes in each time interval. At the end of the time interval, the pattern detection processor analyzes the behavior pattern during the interval, and if an irregular pattern is detected, transmits an alert to the remote control core with the latest findings. The analysis may also include consideration of behavior pattern logged in preceding time intervals.

In an embodiment in which the pattern recognition processor monitors calls to the local operating system 13, the signal monitor 12b may be provided for hooking into the operating system on the local machine, to audit operating system calls (for example, file input-output, network input-output, memory management, etc.). The signal monitor module may be closely fused into the operating system, for example, as an extension to the operating system kernel. Through such ties to the operating system, the signal monitor module monitors and logs operating system call activity, innocent or malicious. The pattern recognition processor 12a periodically analyzes the log of operating system calls to detect any irregular patterns.

The pattern recognition processor may be trained or adapted to detect other irregular and/or malicious or viral behavior patterns. The irregular behavior patterns may correspond to, for example, known or unknown viruses, Trojans, worms, or other malicious code (for example, with characteristics of memory resident, file, and/or macro viruses). The pattern recognition processor may also be able to detect internal malicious operations such as negligent or directly offensive "delete" operations spanning several enterprise machines.

The pattern recognition processor may use, in addition to pattern recognition technology, a plurality of detection methodologies, such as integrity checking (e.g., checksum or detecting a change to a program's file size), polymorphic code detection, interrupt monitoring (monitoring of access to restricted system resources), statistic analysis, signature and/or heuristic scanning, etc. Some exemplary virus/malicious code detection methodologies are described in U.S. application Ser. Nos. 09/905,342, 09/905,340, 09/905,533, 09/905,341, 09/905,532 and 09/905,343, all filed Jul. 14, 2001, 09/823,673, filed Mar. 30, 2001, and 60/334,420, filed Nov. 30, 2001, each of which is incorporated herein by reference.

The remote control core 12c provides a network relay for transmitting locally assessed information to the server, and for receiving instructions from the server for remote management of the local workstation. The remote control process may include an administrative protocol for local security measures. The local protective (or interventional) security measures may include, for example, blocking any access to selected files, setting a quarantine on a suspect file to prevent copying of the suspect file (to a server, another storage media, another domain, etc.), preventing file transfer and/or other communications from a local machine to other machines, setting a quarantine on a particular user to limit the user's access to local and/or enterprise resources (for example, the file system), curing an infected file, etc.

Preferably, an abstract control mechanism is provided, which complies with the system's software characteristics (for example, any requirements of the installed code of the operating system, application software, utilities, dynamic linked libraries, etc.), to achieve the blocking and/or interventional functionalities that may be invoked remotely. It is also preferred that the control mechanism not be bound by communication protocol, in order to minimize communication overhead. Remote management may be performed by the server by specifying the operation to be executed (for example, library name and function call, utility name, parameters, etc.). The remote client then dynamically executes the operation. The abstract remote-management core enables system-supported operations to be specified remotely. Thus, fixed protocol restrictions may be minimized at the remote control core.

Virtually any remote operation may be specified and carried out, in order to shut down a security gap before more conventional security policies are deployed. For example, if alerts associated with suspicious operating system call to a limited access system resource are received by a server from a predetermined number (e.g., three) or more of the local machines in a cluster, the server may broadcast to each machine in the cluster to instruct the machine through its remote control core to (a) prohibit access to the targeted system resource for a specified time period, (b) while running in emulation mode to identify the source (and other details) of operating system calls during the time period.

Figure 2A:
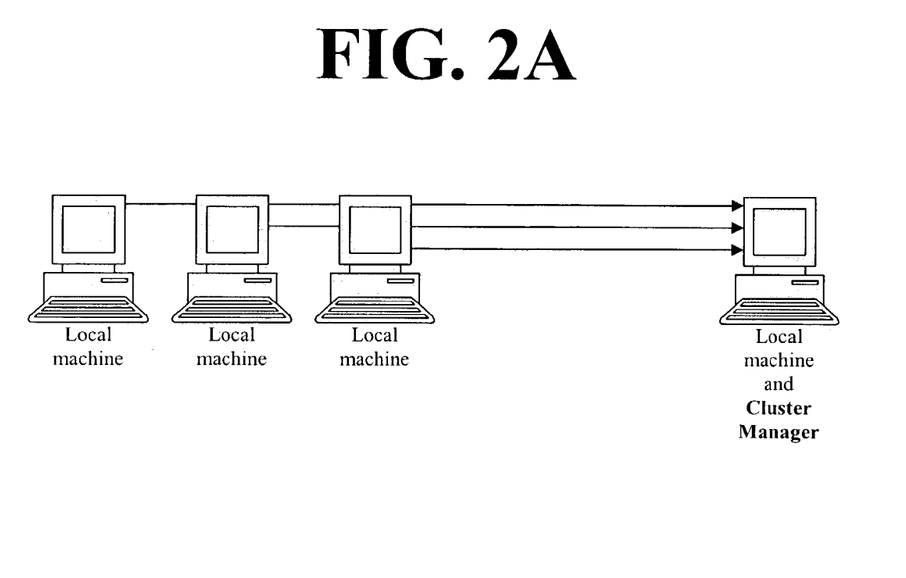
FIG. 2A shows a schematic representation of clustering of local machines, according to another embodiment of the present application.
Figure 2B:
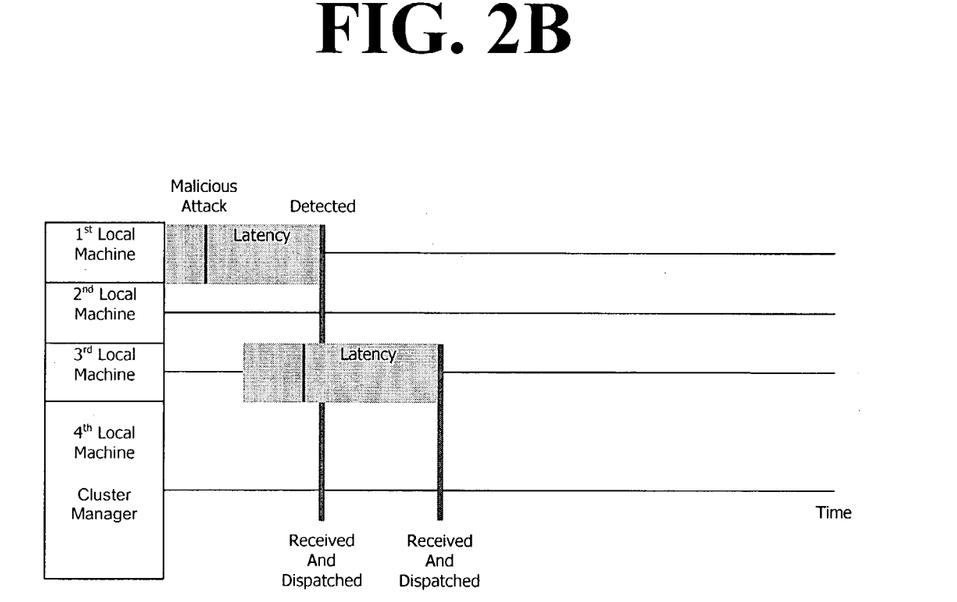
FIG. 2B shows a schematic representation of timing in a cluster of local machines in the embodiment corresponding to FIG. 2A.

By clustering several local machines over a local area network (LAN), clients may be readily grouped into a synchronized network. One or more cluster managers may be recursively used to transmit the flow of questionable behavioral patterns to the server 14 (FIGS. 2A and 2B). A cluster manager may be resident on a local machine. The local machines may transmit a compressed signature of their latest findings as an alert to the cluster manager.

A local machine may be any of the known computing platforms (for example, an IBM-compatible or Macintosh personal computer, a workstation, a handheld computer or computing device, other devices with an embedded processor and operating system, etc.). The LAN may be conventionally cable-connected or wireless (for example, conforming with IEEE 802.11b standard).

A dedicated machine may serve as the server 14. By collecting enterprise-wide alerts, the server is able to monitor global suspicious activity. The server may use a rule-based methodology (and/or other artificial intelligence) for determining when countermeasure operations are to be taken at the local machines, and the countermeasures that are taken when a certain threshold of similar alerts has been met.

For example, the server may take one or more of the following actions: notify enterprise-wide (user and resource) administration utilities, for example, to restrict user and/or resource access; issue a warning to all users by e-mail (or broadcast); instruct each (possibly) infected machines to shut down; pinpoint the exact flow of the malicious code through the network; and provide a quick solution of how to defend against the threat (for instance, disabling a targeted software such as an e-mail program or a word processing program, or shutting down a certain TCP/IP port), by broadcasting to the clients through their remote control core.

Figure 3:
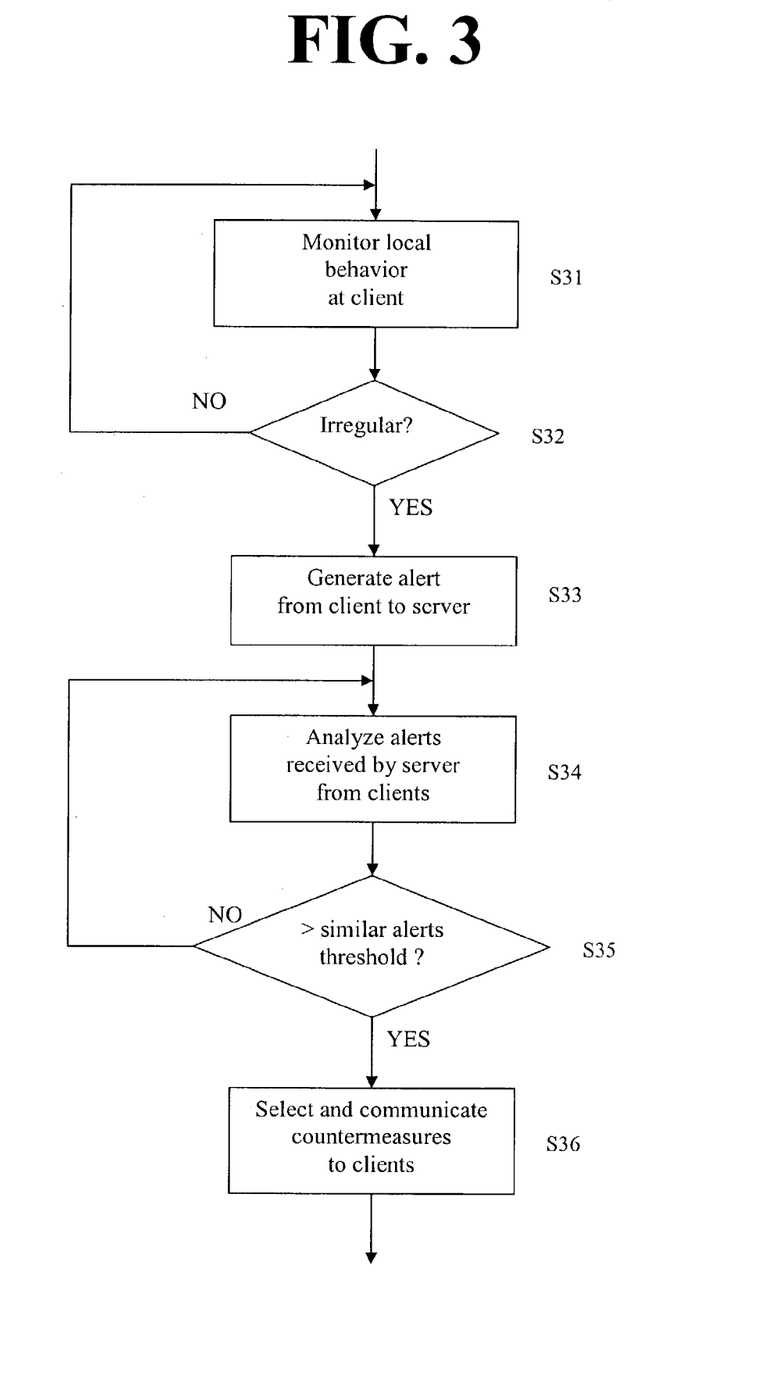
FIG. 3 shows a flow chart of a method of detecting and countering malicious code in an enterprise network, according to an embodiment of the present application.

A method of detecting and countering malicious code in an enterprise network, according to an embodiment of the present application, is described with reference to FIGS. 1-3. The pattern recognition processor 2a or 12a of a local machine 2 or 11 monitors local operations, such as calls to the local operating system, to detect irregular behavior patterns at the local machine (step S31). Optionally, the signal monitor 12b may register the operating system calls (for example, file input-output calls, network input-output calls, memory management calls, etc.) at the local machine to maintain a log of the local operating system calls. In any event, if the pattern recognition processor detects irregularity in the local behavior pattern (step S32), the processor generates an irregular behavior alert (step S33). The alert is communicated from the local machine to the server 3 or 14 through, for example, a network relay of the remote control core 12c, as well as optionally a cluster manager. Meanwhile, the server analyzes irregular behavior alerts from the local machines (step S34). The server may be a dedicated system allocated to the task of monitoring for suspicious activity in the enterprise network. If the number of similar alerts exceeds a threshold number over a corresponding time period (for example, five alerts over five minutes, twelve alerts over ten minutes, etc.) [step S35], the server selects one or more countermeasure operations according to the nature of the alerts and communicates the counter measure operations to the clients (step S36). The countermeasure operations may include a notification to enterprise-wide administration utilities, an instruction to shut down one or more local functionalities, and/or a warning by e-mail to users. The countermeasure operations may be identified by library name and function call, utility call, etc.

Proactively detecting and countering against unknown malicious code (e.g., viruses, worms, Trojans, embedded scripts, or any other form of software virus) may be obtained through harnessing the power of pattern recognition methodologies (such as neural net and other artificial intelligence) to closely track irregular system behavior. In the embodiments described above, data can be synchronized across networked enterprise workstations, which may be clustered, to detect any widespread irregularities that may indicate a new virus. If virus-like irregularities are detected, an integrated, abstract remote-management core may be employed to perform on-the-fly countermeasures to thwart the virus, as well as shield against its further infestation.

Figure 4:
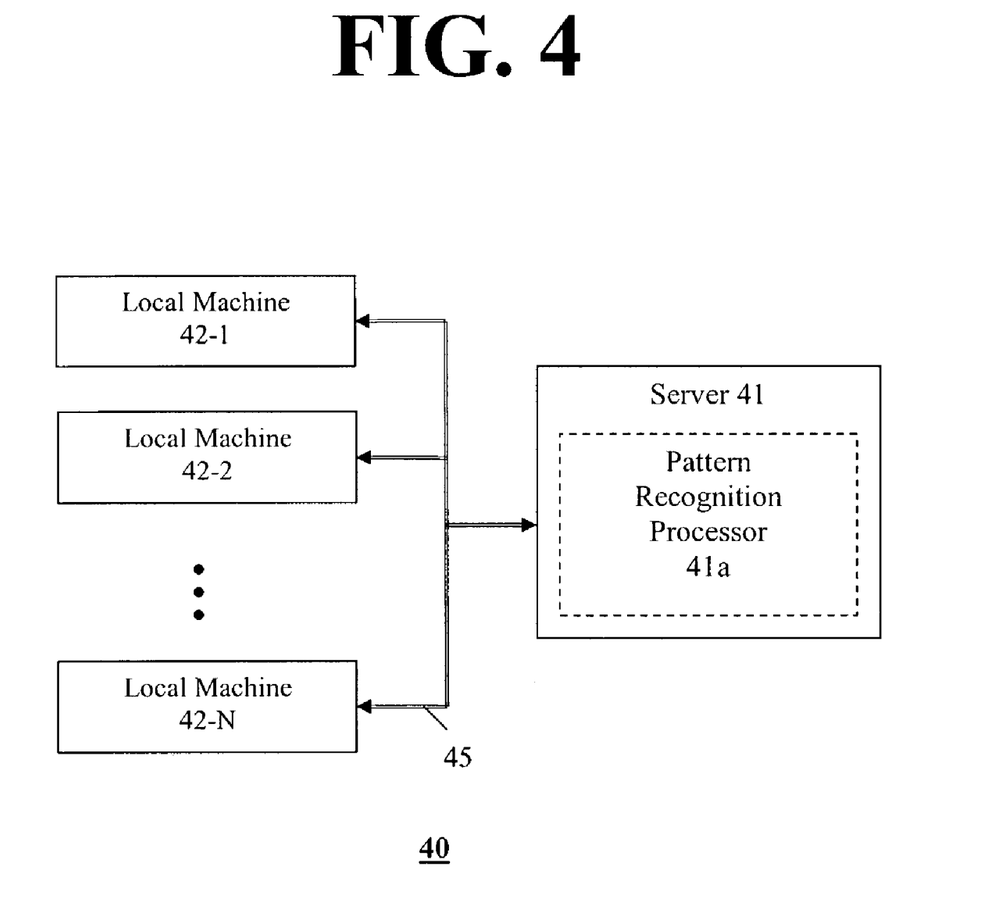
FIG. 4 shows a block diagram of a system for detecting and countering malicious code in an enterprise network, according to another embodiment of the present application.

According to another embodiment (FIG. 4), data may be collected from local machines (42-1 through 42-N) and processed by a pattern recognition processor 41a in a centralized location (server 41). Collection and processing of data in a centralized location may increase network traffic. The increased traffic may be alleviated, however, by using a simplified detection configuration (for example, by downsizing client data collection).

Although it is preferred that the server in the embodiments described above is a dedicated station, a station having other functionalities and duties may also serve as the enterprise monitor. In addition, each machine in the enterprise network may be provided with the functions of the server, as well as functions of the client. The alerts may be passed (packaged or individually) as a message from one machine to the next. When a machine receives a message containing a threshold number of alerts, it may invoke the server functionalities to analyze the alerts and broadcast the local machines an instruction to perform one or more countermeasures available through the local machines remote control core.

In addition, many other variations may be introduced on the embodiments which are exemplary, without departing from the spirit of the disclosure or from the scope of the appended claims. Elements and/or features of the different illustrative embodiments may be combined with each other and/or substituted for each other within the scope of this disclosure and appended claims.

For example, the pattern recognition processor need not be limited to detection of irregular operating system calls. An alert may be generated for every security breach, and not for every irregular security breach. Such a detection scheme is much easier to implement. However, produces many more false alarms.

Additional variations may be apparent to one of ordinary skill in the art from reading U.S. Provisional Application No. 60/373,135, filed Apr. 17, 2002, which is incorporated herein in its entirety by reference.

What is claimed is:

1. A system for detecting and countering malicious code in an enterprise network, comprising:
a server; and
a plurality of local machines connected to the server through the enterprise network, each local machine comprising a pattern recognition processor, the pattern recognition processor monitoring local operations to detect irregular local behavior patterns, and generating an alert after an irregularity in local behavior pattern is detected,
wherein the server monitors for and analyzes irregular behavior alerts from the plurality of local machines, and, if similar alerts are received from at least a threshold number of local machines over a corresponding period of time, the server selects one or more countermeasure operations based on the analysis of the irregular behavior alerts and communicates to the local machines the selected countermeasure operations to be performed by the local machines, wherein a countermeasure operation communicated by the server to the local machines is identified by utility name.

2. A method of detecting and countering malicious code in an enterprise network system having a server and a plurality of local machines, comprising:
monitoring local operations at each local machine to detect irregular local behavior patterns, and, if an irregularity in the local behavior pattern is detected at the local machine, generating an irregular behavior alert from the local machine to the server;
analyzing at the server irregular behavior alerts received from the local machines;
determining whether a threshold number of similar irregular behavior alerts has been exceeded over a predefined period of time beginning with the reception of a first of the similar alerts; and
in response to the determining, selecting one or more countermeasure operations based on the analysis of the irregular behavior alerts and communicating the selected countermeasure operations to the local machines, wherein a countermeasure operation communicated by the server to the local machines is identified by utility name.

3. The method of claim 2 further comprising monitoring calls to the local operating system.

4. The method of claim 3 further comprising maintaining a log of the local operating system calls.

5. The method of claim 2, wherein the countermeasure operations include a notification to enterprise-wide administration utilities.

6. The method of claim 2, wherein the countermeasure operations include an instruction to the local machines to shutdown one or more local functionalities associated with the irregular behavior alerts.

7. The method of claim 2, wherein a countermeasure operation communicated by the server to the local machines is identified by library name and function call.

8. A system for detecting and countering malicious code in an enterprise network, comprising:
a server; and
a plurality of local machines connected to the server through the enterprise network, each local machine comprising a pattern recognition processor, the pattern recognition processor monitoring local operations to detect irregular local behavior patterns, and generating an irregular behavior alert after an irregularity in local behavior pattern is detected,
wherein the server is operable to:
monitors for and analyze irregular behavior alerts received from the plurality of local machines;
determine whether a threshold number of similar irregular behavior alerts has been exceeded over a predefined period of time beginning with the reception of a first of the similar alerts; and
in response to the determining, selecting one or more countermeasure operations based on the analysis of the irregular behavior alerts and communicating to the local machines the selected countermeasure operations to be performed by the local machines, wherein a countermeasure operation communicated by the server to the local machines is identified by library name and function call.

9. The system of claim 8, wherein the pattern recognition processor monitors calls to the local operating system.

10. The system of claim 9, wherein each local machine further comprises a signal monitor, and the signal monitor maintains a log of local operating system calls.

11. The system of claim 8, wherein each local machine further comprises a remote control core including a network relay for communication with the server, the irregular behavior alert is communicated from the local machine through the network relay to the server, and remote control instructions are received by the local machine through the network relay.

12. The system of claim 8 further comprising a cluster manager, wherein the irregular behavior alerts are communicated from the plurality of local machines through the cluster manager to the server.

13. The system of claim 8, wherein the server is a dedicated system for monitoring suspicious activity in the enterprise network.

14. The system of claim 8, wherein the countermeasure operations include a notification to enterprise-wide administration utilities.

15. The system of claim 8, wherein the countermeasure operations include an instruction to the local machines to shutdown one or more local functionalities associated with the irregular behavior alerts.

16. A program storage device readable by a machine, tangibly embodying a program of instructions executable by the machine to:
monitor local operations at each local machine to detect irregular local behavior patterns, and, if an irregularity in the local behavior pattern is detected at the local machine, generating an irregular behavior alert from the local machine to the server;
analyze at the server irregular behavior alerts received from the local machines;
determine whether a threshold number of similar irregular behavior alerts has been exceeded over a predefined period of time beginning with the reception of a first of the similar alerts; and
in response to the determining, select one or more countermeasure operations based on the analysis of the irregular behavior alerts and communicating the selected countermeasure operations to the local machines, wherein a countermeasure operation communicated by the server to the local machines is identified by utility name.

17. The system of claim 1, wherein the pattern recognition processor monitors calls to the local operating system.

18. The system of claim 17, wherein each local machine further comprises a signal monitor, and the signal monitor maintains a log of local operating system calls.

19. The system of claim 1, wherein each local machine further comprises a remote control core including a network relay for communication with the server, the irregular behavior alert is communicated from the local machine through the network relay to the server, and remote control instructions are received by the local machine through the network relay.

20. The system of claim 1 further comprising a cluster manager, wherein the irregular behavior alerts are communicated from the plurality of local machines through the cluster manager to the server.

21. The system of claim 1, wherein the server is a dedicated system for monitoring suspicious activity in the enterprise network.

22. The system of claim 1, wherein the countermeasure operations include a notification to enterprise-wide administration utilities.

23. The system of claim 1, wherein the countermeasure operations include an instruction to the local machines to shutdown one or more local functionalities associated with the irregular behavior alerts.

24. A system comprising:
a processor; and
a program storage device readable by the system, tangibly embodying a program of instructions executable by the machine to:
monitor local operations at each local machine to detect irregular local behavior patterns, and, if an irregularity in the local behavior pattern is detected at the local machine, generating an irregular behavior alert from the local machine to the server;
analyze at the server irregular behavior alerts received from the local machines;
determine whether a threshold number of similar irregular behavior alerts has been exceeded over a predefined period of time beginning with the reception of a first of the similar alerts; and
in response to the determining, select one or more countermeasure operations based on the analysis of the irregular behavior alerts and communicating the selected countermeasure operations to the local machines, wherein a countermeasure operation communicated by the server to the local machines is identified by utility name.

* * * * *